United States Patent
Tidrow et al.

(10) Patent No.: US 6,183,715 B1
(45) Date of Patent: *Feb. 6, 2001

(54) LOW POLARIZABILITY OF $SB^{5+}$ FOR USE IN FABRICATION OF LOW DIELECTRIC CONSTANT MATERIALS

(75) Inventors: Steven C. Tidrow, Silver Spring, MD (US); Arthur Tauber, Elberon, NJ (US); William D. Wilber, Neptune, NJ (US); Robert D. Finnegan, W. Long Branch, NJ (US)

(73) Assignee: The United States of America as represented by the Secretary of the Army, Washington, DC (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/069,794

(22) Filed: Apr. 30, 1998

(51) Int. Cl.$^7$ .................................................. C01G 30/02
(52) U.S. Cl. .......................... 423/593; 423/617; 423/635; 423/641
(58) Field of Search .................................... 428/697, 688, 428/689, 702, 469, 471, 472, 701; 505/238, 239, 237, 700; 257/728; 423/263, 593, 617, 635, 641

(56) References Cited

U.S. PATENT DOCUMENTS 5,813,584 * 9/1998 Tauber et al. ........................ 505/238
5,856,276 * 1/1999 Koshy et al. ........................ 505/239

FOREIGN PATENT DOCUMENTS 4-331714 * 11/1992 (JP).
6-112082 * 4/1994 (JP).

OTHER PUBLICATIONS

Paulose K.V. et al., "Sythesis of YBa2SbO6: a possible new substrate for YBa2Cu3O7-x thin films", Supercond. Sci Technology 5, pp. 31–33. (No month), 1992.*

Gray et al., "Strontium Ceramics for Chemical Applications", J.Power Sources 6(2), pp. 121–142.(No month), 1981.*

Politova et al., "Antiferroelectric phase transitions in AB0, 5SBO,503 perovskite structure compounds". Ferroelectrics, vol. 81. pp. 245–248. (No month), 1988.*

Blasse, G., "New Compunds with Perovskite Like Structures", Konickl. Ne Akad. Wetenschap, Proc. Ser. B 67(3), pp. 312–313 (Apr./1964).*

Whitman, G. Rauser and Kemmler–Sack, S., "Uber die Ordnung von Blll und MV in Perowskiten vom Typ A2IIBIIMVO6" Z. aNORG aLLG. cHEM., No. 482, pp. 143–153. (No Month), 1981.*

Fesenko, E.G. et al., "Synthesis and Study of A2Sb5 + B'06 and A3Sb25 +B'o9–Type Ternary Oxide Perovskite Structure," Isv. Akad. Nauk SSSR, Neorg. Matter., 6(4), 800–2 (Russian) pp. 800–802. (No Month), 1970.*

Dielectric Properties of Perovskite Antimonates, S.C. Tidrow, et al, U.S. ARL, Physical Sciences Directorate, Ft. Monmouth, NJ 077903–5601 (No Date/Month).

* cited by examiner

Primary Examiner—Deborah Jones
Assistant Examiner—Stephen Stein
(74) Attorney, Agent, or Firm—Paul S. Clohan, Jr.

(57) ABSTRACT

The microwave properties of numerous perovskite antimonates like $A_2MeSbO_6$ where A=Ba or Sr, Me=a rare earth, Y, Sc, Ga, or In and $A_4MeSb_3O_{12}$ where A=Ba or Sr and M=Li, Na or K were measured at 10 Ghz and 300 K. Using the microwave properties and lattice parameters of these materials, the Clausius-Mossotti relationship and a nonlinear regression fitting program, the polarizability of $Sb^{5+}$ was investigated and determined to be $1.18\pm0.49$ $A^3$. This low polarizability and the low loss of antimonates in general indicate that $Sb^{5+}$ is an excellent candidate for use as a constituent in the fabrication of low dielectric constant, low loss, lattice matching perovskite oxide microwave substrates.

1 Claim, 1 Drawing Sheet

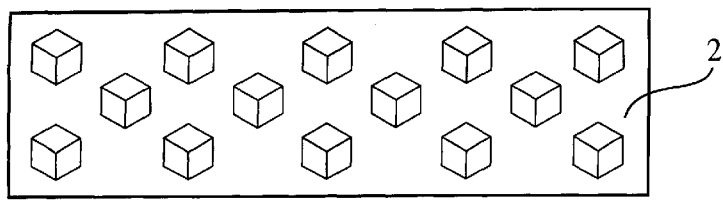
FIG. 1
FIG. 1a
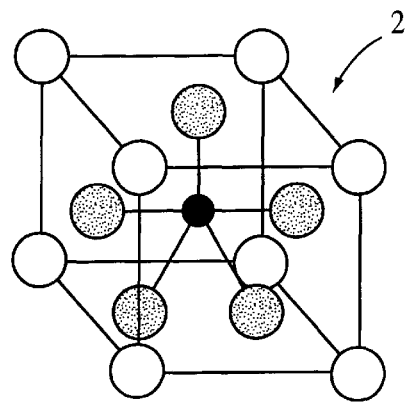
FIG. 1b
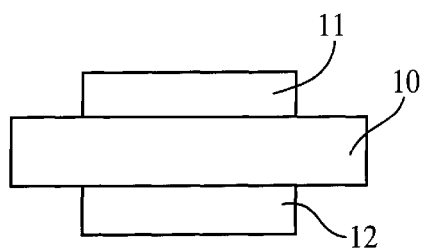
FIG. 2
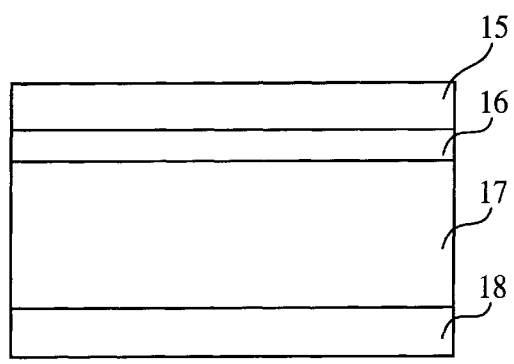
FIG. 3

US 6,183,715 B1

LOW POLARIZABILITY OF SB$^{5+}$ FOR USE IN FABRICATION OF LOW DIELECTRIC CONSTANT MATERIALS

RIGHTS OF THE GOVERNMENT

The invention described herein may be manufactured, used and licensed by or for the United States Government for Governmental purposes without payment to us of any royalty thereon.

BACKGROUND OF THE INVENTION

1. Field of the Invention

The present invention relates to the field of low dielectric constant materials for use as substrates, buffer layers, and dielectric layers in construction of microwave and millimeterwave technology with particular emphasis toward substrates for microwave perovskite oxide devices including high critical temperature superconductors, ferroelectrics, magnetoresistors, conductors, semi-conductors, piezoelectrics, paraelectrics, pyroelectrics, etc.

SUMMARY OF THE INVENTION

Until now, the polarizability of Sb$^{5+}$ was unknown. By constructing numerous compositions of matter including compositions which contain pentavalent antimonate (Sb$^{5+}$), and by measuring the dielectric constants of these compositions, it has been determined that Sb$^{5+}$ has an unordinarily low polarizability which results in the fabrication of low dielectric constant materials as determined using the polarizability rule. These substrates may be suitable as microwave compatible substrates upon determination of the loss tangent by measurement. The basic difficulty associated with lowering the dielectric constant of a material has to do with the atoms that comprise the structure, the polarizability of those atoms, the volume of space tht those atoms occupy (which depends on the crystal structure for crystalline materials or the packing arrangement for amorphous, polymeric as well as other types of materials). The precise relationships for predicting dielectric constants can be found in Shannon et al. [Dielectric polarizabilities of ions in oxides and fluorides], J. Apply. Phys., 73, 348(1993). However, until now, there has been no determination of the low polarizability of Sb$^{5+}$ which is a key to manufacturing lower dielectric constants as substrates and dielectric layers for use as structures especially in microwave devices.

Accordingly, it is an object of this invention to provide a low dielectric constant material for use as a substrate and dielectric layers particularly for various microwave devices. It is another object of this invention to provide suitably low dielectric constant microwave compatible substrates that satisfy the requirements for the majority of perovskite oxide single and multilayer microwave devices. Since microwave device requirements are typically more stringent than non-microwave device requirements, such substrates can also be used for most non-microwave devices. Further, it is another object of this invention to provide a suitably low dielectric constant microwave compatible substrate that satisfies the requirements for the majority of all HTSC thin film single and multilayer microwave and non-microwave devices. It is a further objective of this invention to provide a suitably low dielectric constant microwave compatible substrate that satisfies the requirements for the majority of ferroelectric, pyroelectric, piezoelectric, magnetoresistive, paraelectric etc. thin film single and multilayer microwave and non-microwave devices. Some of the specific materials shown here will provide lattice matching and chemical compatibility with many such perovskite oxide films and hence provide the foundation for epitaxial growth of high quality devices which translate into high quality device structures and microwave devices.

BRIEF DESCRIPTION OF THE DRAWINGS

A better understanding of the invention will be obtained when the following detailed description of the invention is considered in connection with the accompanying drawings in which:

FIG. 1 shows Sb in the 5+ state dispersed evenly in any material crystalline or otherwise.

FIG. 1a shows an amorphous non-crystalline layer with Sb5+ dispersed evenly throughout.

FIG. 1b shows Sb5+ in a perovskite oxide dielectric for use as a substrate and dielectric barrier layer in HTSC devices.

FIG. 2 shows a substrate of a microwave device containing Sb5+.

FIG. 3 shows a multilayered microwave device structure with Sb5+ contained in the dielectric layers.

DETAILED DESCRIPTIONS OF SPECIFIC EMBODIMENTS

The following article is hereby incorporated into this specification and becomes a part thereof:

S. C. Tidrow, A. Tauber, W. D. Wilber, R. D. Finnegan, D. W. Eckart, and W. C. Drach "Dielectric Properties Of Perovskite Antimonates". (May 1997).

As shown in FIG. 1, an amorphous material 2 has pentavalent antimonate dispersed evenly throughout the layer to form a bulk material with an effective dielectric constant lower than that of the material by itself. Because of the low polarizability of pentavalent antimonate, the dielectric constant of numerous bulk materials can be lowered as can be calculated using the newly established polarizability of pentavalent antimonate and the basic principles set forth by Shannon, et al. which is verified by experiment. By evenly and randomly distributing the pentavalent antimonate, the dielectric if originally isotropic will remain isotropic with respect to microwave radiation. When the dielctric loss of such a material is relatively low, the material thus forms the basic building blocks, substrate and dielectric layers, for use in microwave devices.

As shown in FIG. 2, a crystalline material 10 (which also encompases the polycrystalline subclass) has pentavalent antimonate dispersed evenly throughout the layer to form a bulk crystalline material with an effective dielectric constant lower than that of the material by itself. Because of the low polarizability of pentavalent antimonate, the dielectric constant of numerous bulk crystalline and polycrystalline materials can be lowered as can be calculated using the newly established polarizability of pentavalent antimonate and the basic principles set forth by Shannon, et al. that is verified by experiment. By evenly and randomly distributing the pentavalent antimonate, the dielectric if originally isotropic will remain isotropic with respect to microwave radiation. When the dielctric loss of such a material is relatively low, the material thus forms the basic building blocks, substrate and dielectric layers, for use in microwave devices which for example contain upper 11 and lower 12 metal layers.

As shown in FIG. 3, when a material 15, 17 whether a bulk amourphous, bulk polycrystalline, single crystal, bulk polycrystalline solid solution, bulk single crystal solid solution or material in another form including combinations of the above mentioned forms has pentavalent antimonate dispersed evenly throughout the layer, the new material will have an effective dielectric constant lower than that of the material by itself. Because of the low polarizability of pentavalent antimonate, the dielectric constant of numerous forms of material can be lowered as can be calculated using the newly established polarizability of pentavalent antimonate and the basic principles set forth by Shannon, et al. that are verified by experiment. By evenly and randomly distributing the pentavalent antimonate, the dielectric if originally isotropic will remain isotropic with respect to microwave radiation. When the dielctric loss of such a materail is relatively low, the material thus forms the basic building blocks, substrate and dielectric layers, for use in microwave devices.

As shown in FIG. 2, materials as described in the above figures and perovskite oxides materials like $Ca_2AlSbO_6$, LCAS (a solid solution between $Ca_2AlSbO_6$ and $LaAlO_3$) and other perovksite oxides in which pentavalent antimonate is present can be used as the substrate and dielectric layer (11) for growth of single layer microwave devices with electrodes as shown schematically (parts 11 and 12). These electrodes can consist of normal metals for materials as described in the above three figures. For peroskite oxides materials like $Ca_2AlSbO_6$, LCAS (a solid solution between $Ca_2AlSbO_6$ and $LaAlO_3$) and other perovksite oxides which contain pentavalent antimonate, these electrodes (11, 12) can consist of normal metals as well as perovskite oxide electrodes like those of high critical temperature superconductors.

As shown in FIG. 3, materials as described in the figures above perovskite oxides materials like $Ca_2AlSbO_6$, LCAS (a solid solution between $Ca_2AlSbO_6$ and $LaAlO_3$) and other perovksite oxides in which pentavalent antimonate is present can be used as the substrate and dielectric layers (15, 17) for growth of multilayer microwave devices with electrodes as shown schematically (parts 18 and 16). These electrodes can consist of normal metals for materials as described in the above three figures. For peroskite oxide materials like $Ca_2AlSbO_6$, LCAS (a solid solution between $Ca_2AlSbO_6$ and $LaAlO_3$) and other perovksite oxides which contain pentavalent antimonate, the base layer (18) can consist of normal metals while (16) can consist of a normal metal (typically for none epitaxial growth of consecutive layers) or perovskite oxide electrode (typically needed for expitaxial growth of consecutive perovskite oxide layers).

Of course combinations of these substrate, dielectric layers and device structures (FIGS. 1–3) can be used to make more sophisticated single and multilayer device structures; however, it is not our intent to teach these structures as so many are already seen in the art. Instead, it is our intent to show that pentavalent antimonates can be used in various materials to lower the dielectric constant of a material and provide the structure necessary for a wide variety of devices where lower dielectric constants are needed.

What is claimed is:

1. A low dielectric constant, low loss material wherein said material is a perovskite antimonate having the formula $A_4MeSb_3O_{12}$ where A=Ca and Me=Li, Na or K.

* * * * *